Oct. 12, 1965  K. EICKMANN  3,211,183

HYDRAULIC OR PNEUMATIC CONTROLLER

Filed Feb. 4, 1963  3 Sheets-Sheet 1

INVENTOR.
KARL EICKMANN
BY

INVENTOR.
KARL EICKMANN

Oct. 12, 1965    K. EICKMANN    3,211,183
HYDRAULIC OR PNEUMATIC CONTROLLER
Filed Feb. 4, 1963    3 Sheets-Sheet 3

INVENTOR.
KARL EICKMANN
BY
*Burgers, Dinklage & Sprung*

United States Patent Office 3,211,183
Patented Oct. 12, 1965

3,211,183
HYDRAULIC OR PNEUMATIC CONTROLLER
Karl Eickmann, 2420 Isshiki Hayama-machi,
Kanagawa-ken, Japan
Filed Feb. 4, 1963, Ser. No. 256,079
Claims priority, application Germany, Feb. 8, 1962,
B 65,860
13 Claims. (Cl. 137—625.68)

The present invention relates to hydraulic or pneumatic controllers, and more particularly to a controller for control of fluid flow through at least one flow path including a control casing having a tubular control piston longitudinally slidably disposed therewithin and a separate drive shaft disposed within the tubular control piston and extending at its ends outwardly through the ends of the control casing for controlling the movement of the control piston within the control casing to regulate fluid flow through the casing via fluid flow passages communicating with the casing interior.

Many forms of hydraulic or pneumatic controllers are known which have proved to have a reasonable useful life over extended periods of operation. Generally, a fluid, such as a liquid or a gas, passes through the controller which acts in the manner of a valve, such that the control piston is moved axially from one position to another within the casing so as to permit communication within the casing between two or more fluid passages extending into the casing. Thus, fluid flow many be blocked off or switched from one passage to another by reason of the particular position of the control piston within the control casing. A plurality of fluid passages is commonly provided in the controller which extend from the casing to the exterior thereof for connecting with various conduits leading to pumps, motors, and various other machines using fluids, such as hydraulic or pneumatic fluids, under pressure.

In the past, the communication of fluid from a reservoir, pump, or otherwise to a fluid machine, etc., was carried out usually with the desired regulation and control by passing such fluid into the control casing and through a fluid passage in the control piston center. In order to operate a control piston having a central passage therethrough, so as to move such piston axially within the casing for the desired regulation, a pair of axial end shafts was provided, each shaft being inserted into a corresponding axial end of the control piston and fixed thereto, for instance by welding, bolting, or similar connecting means.

However, this type of construction involves high manufacturing costs as well as an increase in the time devoted to the actual assembling of the parts. Furthermore, during the manufacturing of such control pistons, the center portion of the control piston and the axial end shafts inserted therein sometimes are misaligned, such that their longitudinal axes do not coincide along a common center line. Such defects in manufacturing naturally lead to friction between the control casing and the control piston when the control piston is moved back and forth within the casing by axial forces placed upon the shaft ends connected thereto or between the sealing means surrounding the openings in the casing through which the shaft ends extend to the exterior of the casing and such end portions of the shafts. Also, leakage often occurs through said openings as well inasmuch as the axial displacement of the piston and the shaft ends does not occur along the same center line. Additionally, in the case where a bushing is placed between the inside casing wall and the outside piston wall to reduce wear on the respective abutting parts, even the bushing is subjected to friction and concomitant accelerated wear due to such misalignment.

Thus, the prior art constructions suffer from the disadvantage that the central axis of one or both shaft ends is not coincidental with the common axis of the unit, i.e. with the central axis of the bore in the central part of the control piston and the central axis of the control casing within which such central part of the control piston is desirably concentrically positioned. As will be seen from the foregoing, while painstaking attempts must be made to place the shaft ends into the control piston such that their individual axes coincide with the axis of the control piston, and desirably such common axis is parallel or coincidental with the axis of the casing, the inherent undependability of the human element still leaves much to be desired in manufacturing controllers of the foregoing type due to the particular kind of construction involved.

A further objection to the controller constructions heretofore used in the art is that they do not lend themselves readily to automatic production, and it will be appreciated that because of the nature of the construction contemplated wherein parts are adapted for sliding abutment against other parts, expensive materials had to be used. Specifically, the control pistons of conventional construction entail an additional manufacturing expense in that the center part thereof was usually made from hardened steel, and in order to weld or otherwise suitably connect the center part of the piston with the axial end shaft, such shafts also contemplated the use of similar expensive materials. Accordingly, conventional hydraulic or pneumatic fluid flow controllers are expensive not only in the material requirements therefor, but also in the need for a comparatively long and tedious manufacturing and assembling time.

It is an object of the present invention to overcome the foregoing drawbacks and to provide a simple and efficient controller which is inexpensive as far as material costs are concerned, and economical insofar as manufacturing and assembling time is concerned, and which avoids and prevents any friction from being generated by misalignment or decentering of the shaft ends from the common axis of the control piston, yet which provides for extended operation efficiently and over a markedly long useful life.

It is another object of the invention to provide a controller of the foregoing type having reduced dimensions so that the same may be inserted as a unit within a recess or bore of a machine in connection with which the same is used, or be fastened onto such machine, yet occupying comparatively less space than controller constructions heretofore provided.

It is still another object of the present invention to provide a hydraulic or pneumatic controller for control of fluid flow through at least one flow path, including a control casing having a tubular control piston longitudinally slidably disposed therewithin and a separate drive shaft disposed within the tubular control piston and extending at its ends outwardly through the ends of the control casing for controlling the movement of the control piston within the control casing to regulate fluid flow through the casing via fluid flow passages communicating with the casing interior, said controller being unaffected by misalignment of the axes of the drive shaft and piston and accordingly being less disposed to friction and leakage, said construction furthermore being simple to manufacture, even where automatic machining methods are employed.

Other and further objects of the invention will become apparent from a study of the within specification and accompanying drawings in which.

Figure 5:
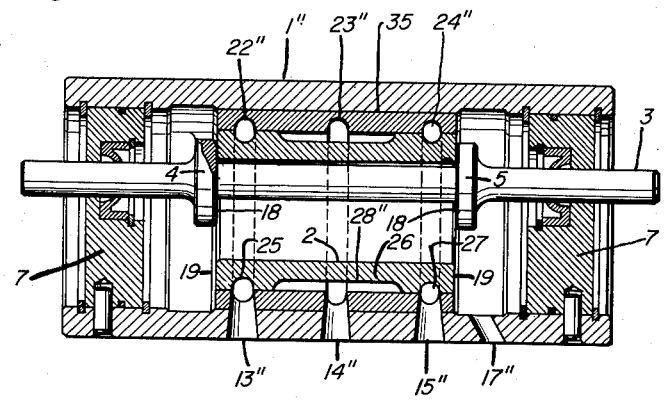
Figure 6:
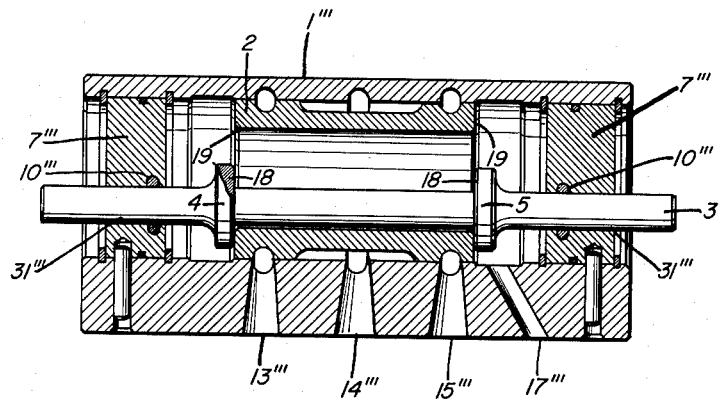

FIG. 5 is a longitudinal view, partially in section, of the controller, in accordance with a further modified embodiment of the invention, in which a bushing is provided between the casing and piston; and FIG. 6 is a longitudinal view, partially in section, of the controller, in accordance with a further embodiment of the invention, in which the axes of the inner and outer walls of the casing are eccentric with respect to one another.

It has been found in accordance with the present invention that a simple and efficient controller construction for control of fluid flow through at least one flow path may be provided, which comprises a control casing having a longitudinal casing channel or bore with casing end walls closing laterally the ends of said bore, a control piston having a longitudinal piston channel or bore, said piston being of smaller length than said casing bore and being disposed longitudinally slidably within said casing bore, a separate longitudinal drive shaft having a smaller transverse dimension than that of said piston bore, said shaft passing through said casing bore and said piston bore and having shaft end portions extending longitudinally slidaby through the corresponding end walls of said casing to the exterior thereof, said piston having shaft engaging means, said shaft having piston engaging means positioned for engaging operatively said shaft engaging means of said piston to displace longitudinally slidably said piston within said casing bore upon the corresponding longitudinally slidable displacement of said shaft ends extending through said end walls, at least two separate passages extending through said casing to said casing bore, and at least one peripheral piston groove defined in the outside periphery of said piston for communicating at least in part through said casing bore, said two passages in one longitudinal position of said piston within said casing bore.

Advantageously, a plurality of separate passages extending through said casing to the casing bore and a plurality of peripheral piston grooves defined in the outside periphery of said piston are provided, said passages and grooves being longitudinally positioned with respect to one another for communicating different pairs of said passages at different longitudinal positions of said piston within said casing and for misregistering said passages and grooves to block communication between any two passages in at least one longitudinal position of said piston within said casing. Correspondingly, said casing bore is preferably provided with a corresponding plurality of transverse casing grooves communicating with said passages.

In accordance with a further feature of the invention, the shaft has a longitudinal axis spaced from the longitudinal axis of the piston bore; furthermore, the piston is provided with shaft engaging laterally outwardly directed transverse end faces and said shaft is provided with longitudinally spaced corresponding piston engaging medially directed transverse flanges, such that said flanges are positioned laterally outwardly of the ends of said piston and in abutment with the adjacent portion of said piston end faces closest the longitudinal axis of said shaft. The shaft and piston are conveniently slightly radially displaceably positioned with respect to one another so that minor angular divergences of one of said axes with respect to the other may take place without causing friction and wear as would otherwise occur in conventional constructions if the axis of the shaft were not parallel and/or coincidental with the axis of the piston.

In accordance with a particular embodiment of the invention, the casing is provided as a casing cylinder with the end walls thereof taking the form of closure discs disposed in the ends of the casing cylinder and having openings therethrough for accommodating the shaft ends extending from the casing interior to the exterior thereof. Also, the piston is provided as a cylindrical piston dimensioned for axially sliding back and forth within the casing cylinder, with the shaft in the form of a cylindrical rod having a smaller diameter than the inside diameter of the piston and also having drive discs at the ends of said shaft exterior to said casing. In this connection, the transverse casing grooves may be provided as annular casing grooves extending around the inner circumference of the casing cylinder, with the piston grooves correspondingly taking the form of annular piston grooves extending around the outer circumference of the piston cylinder. Advantageously, the casing cylinder and the cylindrical piston may have a common axis, such that the axis of the cylindrical rod is parallel and eccentric with respect thereto. More particularly, the shaft engaging transverse end faces may be provided as radially extending annular end faces, with the piston engaging transverse flanges provided as radially extending annular flange faces at least one of which is of smaller diameter than the inside diameter of said piston. In this manner, each of the flange faces will have a peripheral portion in crescent interface abutment with the adjacent annular portion of the corresponding piston end face closest the longitudinal axis of the shaft.

Retaining means may be provided for fixing the closure discs against axial and rotational movement with respect to the casing, and correspondingly packing means may be provided at the openings of the closure discs through which the shaft ends extend, so as to permit axial movement of the shaft ends while sealing the openings from fluid flow therethrough.

Depending upon the regulation to be achieved, one or more of the piston grooves may be extended axially for communicating two or more adjacent passages in one or more axial positions of the cylindrical piston.

Depending upon design conditions desired, the axes of the inner and outer walls of the casing cylinder may either coincide or be parallel but spaced from one another. Thus, where the axes of the inner and outer walls of the casing cylinder are eccentric with respect to one another, i.e. parallel yet spaced apart, the axes of the outer wall of the casing and the rod may be provided so as to coincide while the axes of the inner wall of the casing and the piston may be provided correspondingly to coincide with one another.

It is preferred that the surface of the inner wall of the casing bore be of substantially constant transverse dimension throughout, interrupted only by the presence of the annular casing groove and said passages. Generally, the clearance between the shaft and the surrounding piston represented by the difference in radial length between the radius of the shaft and the radius of the inside of the piston is substantially greater than the clearance between the piston and the surrounding casing represented by the difference in radial length between the radius of the inner wall of the casing and the radius of the outside wall of the piston.

If desired, a bushing may be disposed between the outer wall of the piston and the inner wall of the casing, i.e. either forming a part of the casing inner wall or the piston outer wall with the attendant grooves defined therein, so as to reduce to a minimum friction and wear on the moving parts and thus extend the life of the controller device.

Thus, significantly, the conventional control piston having shaft ends connected thereto is replaced in accordance with the present invention by a control piston of tubular configuration and a separate driving piston in the form of a rod passing through the tubular control piston with its ends extending therepast and through the ends of the casing to the exterior thereof. In this way, the medially extending radial flanges of the drive shaft will always engage a portion of the annular end faces of the piston regardless of minor angular divergences between the normally parallel axes of the piston and shaft. However, due to the comparatively large diameter of the piston bore, as opposed to the diameter of the shaft, any angular divergences of these two axes will not adversely affect the normal operation of the controller device, even if, during the manufacturing and machining of these parts, inaccuracies were to develop.

In the same way, by providing the control casing with a bore of constant diameter throughout, interrupted only by the presence of the annular grooves and passages, friction and wear between the casing and piston will also be reduced to a minimum. By providing suitable packing means in the openings of the closure discs, the shaft ends may be guided therethrough, not only for the usual axial displacement of the shaft but also for limited radial or transverse displacement of the shaft without friction or wear at the closure discs, the flanges and piston end faces being so disposed that any angular divergences may be conveniently accommodated for positive control and regulation of the fluid flow through the controller.

Figure 1:
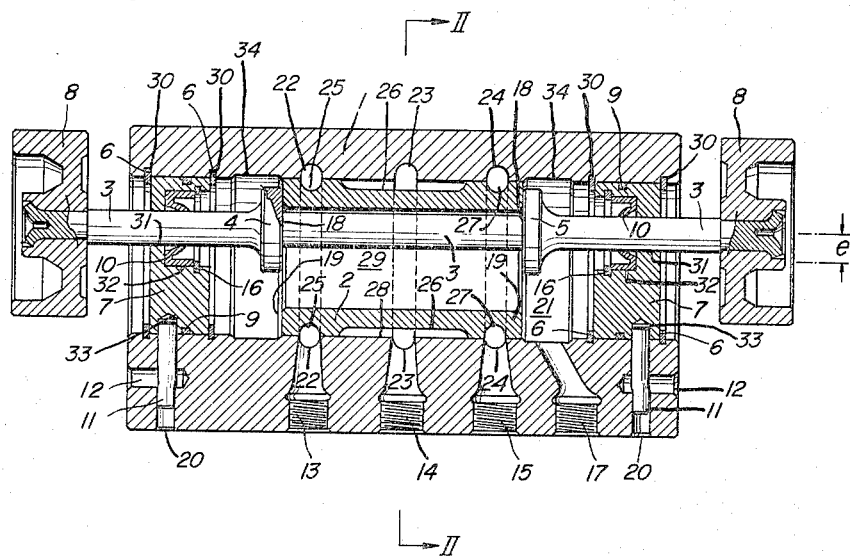
FIG. 1 is a longitudinal view, partially in section, of the controller, in accordance with one embodiment of the invention.
Figure 2:
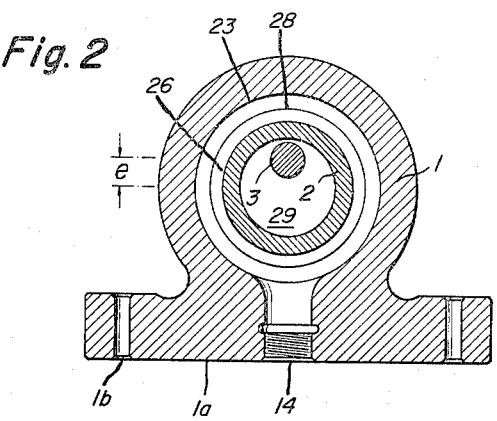
FIG. 2 is a transverse sectional view, taken along the line 2—2 of FIG. 1.

Referring to the drawings, FIGS. 1 and 2 show a controller in accordance with the invention having a control casing 1 of substantially cylindrical configuration, which is provided with a support base 1a at the underside thereof and connecting apertures 1b for fastening the controller to the machine in connection with which the controller is used, or other support means. Casing 1 is provided with end walls in the form of closure discs 7 radially closing off the bore chamber 21 in the interior of casing 1. Tubular control piston 2 of substantially cylindrical configuration is slidably disposed within bore chamber 21 of casing 1, piston 2 being suitably dimensioned so that its outside wall slidably abuts the inner wall of casing 1. Drive shaft 3 is positioned within bore chamber 21 of casing 1 and bore 29 of piston 2, the end portions of shaft 3 extending outwardly to the exterior of casing 1 through the openings 31 in closure discs 7. The ends of shaft 3 exterior to the casing are provided with drive discs 8 which may be grasped manually or by mechanical or electromechanical means for exerting axial pressure on shaft 3 for displacing the same back and forth within the casing to perform the desired flow regulation.

In order to seal the openings 31 against the leakage of fluid therethrough, a sealing ring or other packing means, such as a lip seal 10, may be provided within the recess 32 in closure member 7 at either end of the casing, whereby axial or slight radial displacement of shaft 3 may take place without friction, wear, or leakage occurring at the openings 31.

It will be appreciated that the axis of shaft 3 is eccentric with respect to the axis of bore 29 in piston 2 and bore chamber 21 in casing 1. In order to prevent rotation of the closure discs 7, pins 11 are inserted through bores 20 so as to engage a corresponding recess 33 in the particular closure disc 7. Pin 11 may be permanently affixed within the appropriate bore 20 by denting a portion of the pin by applying force through cross bore 12. Similarly, snap rings 6 are disposed in suitable annular recesses 30 on either side of each of the closure discs 7 to prevent axial displacement thereof as shaft 3 moves back and forth. Snap rings 16 are also provided to retain lip seals 10 within the recesses 32 of the closure discs 7, thus preventing axial displacement of the lip seals as the shaft is displaced. Seal rings 9 or other suitable packing material are provided on each closure disc 7 intermediate the snap rings 6 to prevent leakage between the bore chamber 21 and the casing exterior.

In order to move piston 2 back and forth within bore chamber 21 of the casing, shaft 3 is provided with flanges 4 and 5 having medially directed radial flange faces 18 positioned for abuttingly engaging corresponding portions of the laterally outwardly facing annular end faces 19 of piston 2. By reason of the eccentric positioning of shaft 3 and, in turn, flanges 4 and 5, with respect to piston 2, the annular flange faces 18 of shaft 3 have a peripheral portion in crescent inter-face abutment with the adjacent annular portion of the corresponding piston end face closest the longitudinal axis of the shaft. Accordingly, by displacing shaft 3 in either axial direction, the corresponding flange face 18 will engage the adjacent end face 19 to cause the appropriate movement of piston 2 axially within bore chamber 21. Suitable displacement of piston 2 will occur without friction and wear at the outside wall of piston 2 and the inner wall surface of casing 1, in spite of any radial displacement of shaft 3 with respect to the axis of piston 2, since there is no rigid connection between shaft 3 and piston 2 but rather only surface, line, or point contact. However, the type of contact contemplated by the instant construction between shaft 3 and piston 2 is sufficient for the intended purpose.

The inner wall surface of casing 1 is appropriately provided with annular casing grooves 22, 23, and 24 of arcuate cross-section, said grooves respectively communicating with fluid passages 13, 14, and 15. Collecting grooves or end grooves 34 of axially extended flat construction are provided at either end of bore chamber 21, one end groove 34 communicating with the fluid passage 17, which may be designated a return flow passage. Appropriately, the outside wall of piston 2 is also provided with annular piston grooves 25, 26, and 27, piston groove 25 being designed to register with casing groove 22, and piston groove 27 being designed to register with casing groove 24, with piston groove 26, which is axially extended, designed to register with a corresponding axial portion of the inside wall surface of casing 1 including casing groove 23. It will be appreciated, of course, that while particular groove configurations are illustrated in FIG. 1, any desired axial width, radial depth, cross-sectional shape, etc. may be provided without departing from the spirit of the present invention, these features depending upon the type of controller operation contemplated. Thus, more or less, any number of fluid passages and corresponding grooves in the casing inner wall surface and in the piston outside wall surface may be provided, as will be appreciated by those in the art, depending upon the particular requirements of the controller valve in question.

In operation, it will be seen that as lateral or axial pressure is applied to drive disc 8 on the left, as shown in FIG. 1, shaft 3 and, in turn, piston 2 will be moved to the right within the casing. Upon maximum displacement to the right, piston groove 27 will register with casing groove 34 while the left end portion of piston 2 will uncover casing groove 22 permitting flow communication between passages 17 and 13 via casing groove 34, bore chamber 21, piston bore 29, and casing groove 22. At the same time, due to the extended axial width of piston groove 26, the right end portion of groove 26 will register with the casing groove 24 while the left hand portion of piston groove 26 will register with the casing groove 23, permitting separate flow communication between passages 14 and 15, via casing groove 23, the portion 28 of bore chamber 21 bounded by piston groove 26, and casing groove 24.

On the other hand, where the drive disc 8 on the right, as viewed in FIG. 1, is subjected to lateral or axial force, shaft 3 and, in turn, piston 2 are moved to the left, and upon maximum displacement to the left, piston groove 25 registers with the appropriate casing groove 34 on the left, without consequence, since no appropriate flow passage is provided thereat, although in such maximum movement to the left, piston groove 26, due to its extended axial width, registers on the left with casing groove 22 and on the right with casing groove 23. This permits flow communication between passages 13 and 14 via casing groove 22, the portion 28 of bore chamber 21 bounded by piston groove 26, and casing groove 23. Similarly, the right end of piston 2, upon maximum displacement to the left, exposes casing groove 24 so as to permit flow communication between passages 15 and 17 via casing groove 24, bore chamber 21, and casing groove 34 at the right end of the casing. Upon return movement of piston 2 to the position shown in FIG. 1, all flow passages are blocked from communication with one another. It will be realized, of course, that by altering the axial position, width, and number of casing grooves, piston grooves, and passages, multiple variations in the manner of communicating the flow passages with one another can be achieved as well as the blocking of some or all of such passages from communication with other passages.

Figure 3:
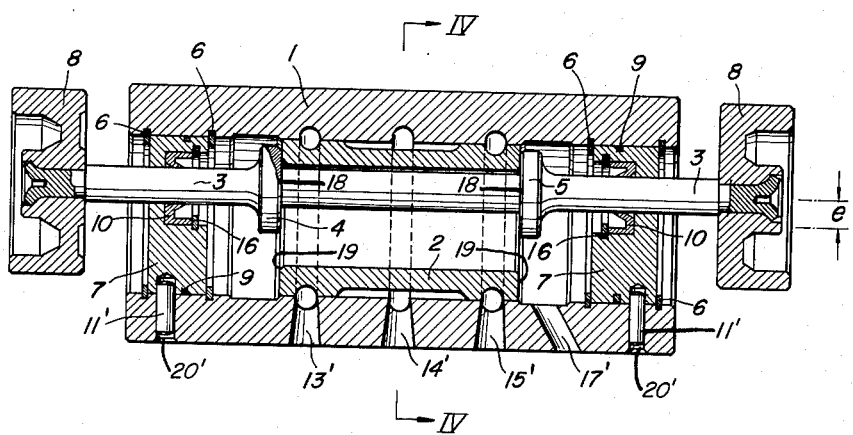
FIG. 3 is a longitudinal view, partially in section, of the controller, in accordance with a modified embodiment of the invention.
Figure 4:
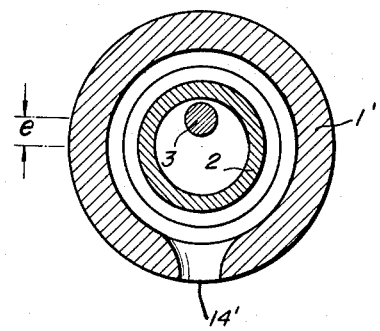
FIG. 4 is a transverse sectional view of the embodiment of FIG. 3, taken along the line 4—4 of FIG. 3.

Referring to FIGS. 3 and 4, it will be seen that a modified embodiment of that illustrated in FIGS. 1 and 2 is provided, all parts being designated with the same numbers used to refer to the parts in FIGS. 1 and 2, except for those parts indigenous to this modification embodiment. Specifically, the base support 1a of the casing has been omitted, whereby casing 1' has a completely cylindrical outer surface, with the passages 13', 14', 15', and 17' being correspondingly shortened in length, due to the fact that these passages extend only to the outer wall surface of the casing rather than also through a base support as contemplated in the embodiment of FIGS. 1 and 2. Similarly, bores 20' for the pins 11' are shorter in length, and pins 11' are merely held against displacement by any conventional means, such as set screws, welding, or other similar connecting means.

The distance e represents the eccentricity of the central axis of shaft 3 with respect to the central axis of piston 2, these axes being parallel yet spaced from one another. If desired, of course, the axis of the inner wall of the casing may be parallel to yet spaced from the corresponding axis of the outer wall of the casing, and in this regard, the central axis of the inner wall of the casing and that of the piston may coincide while the axis of the drive shaft and the central axis of the outer wall of the casing may also coincide.

With regard to FIG. 5, an alternate embodiment of the controller is shown in which the control casing 1" is provided with a bushing 35 therewithin so that the tubular control piston 2 will be slidably disposed within the tubular bushing 35 rather than in direct slidable disposition with the inside wall of casing 1". The casing 1" as well as the bushing 35 and the piston 2 are preferably of cylindrical configuration so that these parts are concentrically disposed with respect to one another. Nevertheless, the relationship between the piston grooves 25, 26 and 27, on the one hand, and the appropriate grooves for passage of fluid into and out of the controller, on the other hand, is similar to that in accordance with the embodiment of FIG. 1, except that the grooves corresponding to the casing grooves 22, 23 and 24 of FIG. 1, are defined in the inside wall of bushing 35 as bushing grooves 22", 23", and 24". The function and operation of grooves 22", 23", and 24", on the one hand, and piston grooves 25, 26, and 27, on the other hand, upon the axial movement of shaft 3 with flanges 4 and 5 in contact via annular flange faces 18 with a peripheral portion of the adjacent piston end faces 19, is the same as that carried out in accordance with the other embodiments of the invention. The fluid passages 13", 14", 15", and 17" serve to control the fluid of the controller in the desired manner with a similar axially extended space 28" between the groove 26 and the inside wall of bushing 35. End closure discs 7 are appropriately provided to close off the ends of the casing 1" and the constructional details of this embodiment are generally the same as those in the embodiment of FIG. 1, with like parts designated by like reference numerals, except for the inclusion of the tubular bushing 35 which serves to reduce to a minimum friction and wear on the moving parts, whereby the life of the controller device will be extended beyond that otherwise possible. The drive discs 8 have been omitted from the ends of the shaft 3 extending outwardly through the closure discs 7, and while the instant embodiment contemplates the use of such drive discs, a different manner of controlling the axial displacement of the shaft 3 may also be used which would render unnecessary the need for such drive discs 8.

With regard to the embodiment of FIG. 6, the controller is shown having a casing 1''' of tubular configuration in which the axes of the inner and outer walls are eccentric with respect to one another. Thus the casing cylinder contains the piston 2 carrying the shaft 3 at an eccentric position therewithin, but by reason of the positioning of the openings 31''' in the closure discs 7''', the axis of the shaft 3 coincides with the axis of the outer wall of casing 1'''. On the other hand, the axis of the piston 2 coincides with the axis of the inner wall of the casing 1'''. The openings 31''' through which the ends of shaft 3 extend are provided with seals 10''' in order to seal the openings 31''' against fluid leakage therethrough. The operation of this embodiment of the controller is similar to that of FIG. 1, and like parts are designated by like reference numerals, with the fluid passages 13''', 14''', 15''' and 17''' having an analogous function to the passages 13, 14, 15 and 17, respectively, of FIG. 1.

While the embodiment of FIGS. 1 and 2 may be readily mounted upon any support means, such as the machine in connection with which the controller valve arrangement of the invention is to be used, the embodiment of FIGS. 3 and 4 and those of FIGS. 5 and 6, respectively, herein may be suitably received within an appropriately dimensioned recess or bore in a support means, such as the machine in connection with which the controller valve construction is to be used, but in either case, the compact construction of the invention allows the controller to occupy less space than conventional constructions.

It will be seen by reason of the fact that the control piston and control shaft are formed as separate elements, that the control piston may be manufactured simply as a tubular cylindrical element, with the shaft being manufactured as a simple rod containing two spaced apart radial flanges adapted to abut the end faces of the tubular piston. No accurate machining is necessary, except insofar as it is desired to provide the casing wall inner surface of constant diameter throughout, except for the presence of the casing grooves, passages, etc. Nevertheless, since closure discs are used as end walls for the casing, the casing may also be readily provided as a tubular cylindrical element of dimensions appropriately accommodating the tubular cylindrical piston therewithin. Angular divergences between the drive shaft and control piston will not adversely affect the operation of the instant controller valve device, especially because of the comparatively large clearance between the shaft and piston bore inside wall, with the only abutting connection between these parts being at the flange faces and piston end faces which may be radially displaced with respect to one another without losing the required abutting contact therebetween and without exerting adverse stresses from one part to another in attempting to move the piston back and forth within the casing. Naturally, the avoidance of precise machining of many of the portions of the controller in accordance with the instant construction permits the use of less expensive materials, and even plastic parts. The simple elements of the present construction also facilitate the easy assembly of the various parts.

In accordance with an optional feature of the present invention, the piston bore need not be centrally located, but rather may be eccentric with respect to the central axis of the piston, and if desired, a plurality of such piston bores may be used, depending upon the operations contemplated by the device and the type of flow communication desired, etc.

In accordance with another feature of the present invention, where it is desired to automatically move shaft 3 back and forth, said shaft may be solenoid operated, for example, either using a separate solenoid adapted to axially abut and displace alternately the drive discs at either end of the shaft or a single solenoid connected to one end of the shaft and movable in both directions to move, in turn, the shaft.

In any event, a most important feature of the construction of the shaft and control piston as separate members is the fact that the piston is absolutely free from the stresses of radial forces as occurred in the case with conventional controller constructions when the shaft axis was not absolutely coincidental with the piston axis. Furthermore, because of the instant construction, although the outside surface of piston 2 should be made of hardened steel in a precise manner so that the same readily slides back and forth within the casing, the shaft may be manufactured of soft steel, bronze, aluminum, plastic, or the like since no undue radial stresses will be encountered which would be transmitted directly from the shaft to the piston. If desired, the flanges on the shaft may be spaced apart a distance slightly larger than the distance between the end faces of the piston, so that a certain amount of play may exist, yet positive coaction will be assured when it is desired to move the piston back and forth within the casing. It may be said, therefore, that the piston floats within the casing and is not influenced by any radial forces acting upon the shaft but only by the axial forces acting thereupon. Indeed, vibrations on the shaft will similarly not be transmitted to the piston to any great extent for the same reasons. A further cause of friction and leakage is thereby minimized.

It will be appreciated that other appropriate means may replace the drive discs on the ends of the shaft extending to the exterior of the casing, depending upon the type of mechanism used for controlling the axial movement of the shaft. Such movement of the shaft may be controlled by an electromechanical mechanism, such as a solenoid as aforesaid, with a timed pattern or sequence of movements if this is so desired.

One advantage in connection with the embodiment of FIG. 6 is that the central axis of the outer wall of the casing is eccentric with respect to the central axis of the inner wall of the casing, while the central axis of the piston is concentric and coincidental with the central axis of the inner wall of the casing. On the other hand, the axis of the shaft is positioned such that the same is eccentric with respect to the central axis of the piston yet concentric and coincidental with the central axis of the outer wall of the casing. Accordingly, the shaft will be disposed centrally with respect to the outer wall of the casing, and upon insertion of the casing within a suitable recess or bore of the machine in connection with which the device is used, the shaft will be centrally located with respect to such recess or bore in the machine, and thus eliminate modifying structures for connecting the shaft so as to achieve a relationship corresponding to the central axis position provided. Naturally, the recess or bore of the machine in connection with which the controller device of the invention is used, may have accommodating flow passages in registry with the flow passages of the controller so that additional connecting means between such passages will be unnecessary.

What is claimed is:

1. Controller for control of fluid flow through at least one flow path which comprises a control casing having a longitudinal casing channel with casing end walls closing laterally the ends of said channel, a control piston having a longitudinal piston channel, said piston being of smaller length than said casing channel and being disposed longitudinally slidably within said casing channel, a separate longitudinal drive shaft having a smaller transverse dimension than that of said piston channel, said shaft passing through said casing channel and said piston channel and having shaft end portions extending longitudinally slidably through the corresponding end walls of said casing to the exterior thereof, said piston having shaft engaging means, said shaft having a longitudinal axis spaced from the longitudinal axis of said piston channel and piston engaging means positioned substantially in abutment with said shaft engaging means of said piston for engaging operatively said shaft engaging means of said piston to displace longitudinally slidably said piston within said casing channel upon the corresponding longitudinally slidable displacement of said shaft ends extending through said end walls, said shaft and piston being slightly transversely displaceably positioned with respect to one another to permit slight relative transverse movements with respect to one another yet with said shaft engaging means and said piston engaging means remaining in abutment with one another, at least two separate passages extending through said casing to said casing channel, and at least one peripheral piston groove defined in the outside periphery of said piston for communicating at least in part through said casing channel said two passages in one longitudinal position of said piston within said casing channel.

2. Controller according to claim 1 wherein a plurality of separate passages extending through said casing to the casing channel and a plurality of peripheral piston grooves defined in the outside periphery of said piston are provided, said passages and grooves being longitudinally positioned with respect to one another for communicating different pairs of said passages at different longitudinal positions of said piston within said casing and for misregistering said passages and grooves to block communication between any two passages in at least one longitudinal position of said piston within said casing.

3. Controller according to claim 2 wherein said casing channel is provided with a corresponding plurality of transverse casing grooves communicating with said passages.

4. Controller according to claim 3 wherein said piston is provided with shaft engaging laterally outwardly directed transverse end faces and said shaft is provided with longitudinally spaced corresponding piston engaging medially directed transverse flanges, said flanges being positioned laterally outwardly of the ends of said piston and in abutment with the adjacent portion of said piston end faces closest the longitudinal axis of said shaft.

5. Controller according to claim 4 wherein said casing is a casing cylinder, said end walls are closure discs in the ends of the casing cylinder having openings through which the shaft ends extend, said piston is a cylindrical piston dimensioned for axial sliding displacement within said casing cylinder, said shaft is a cylindrical rod having a smaller diameter than the inside diameter of said piston and having drive discs at the ends of said rod exterior to said casing cylinder, said transverse casing grooves are annular casing grooves extending around the inner circumference of said casing cylinder, said piston grooves are annular piston grooves extending around the outer circumference of said cylindrical piston, said casing cylinder and said cylindrical piston have a common axis, said cylindrical rod has an axis parallel and eccentric with respect to said common axis, said shaft engaging transverse end faces are radially extending annular end faces, and said piston engaging transverse flanges are radially extending annular flange faces at least one of which is of smaller diameter than the inside diameter of said piston, each of said flange faces having a peripheral portion in crescent interface abutment with the adjacent annular portion of the corresponding piston end face closest the longitudinal axis of said rod.

6. Controller according to claim 5 wherein retaining means are provided for fixing said closure discs against axial and rotational movement with respect to said casing cylinder and packing means are provided at the openings of said closure discs through which said rod ends extend permitting axial movement of said rod ends while sealing said openings from fluid flow therethrough.

7. Controller according to claim 5 wherein one of said piston grooves is extended axially for communicating two adjacent passages in one axial position of said cylindrical piston.

8. Controller according to claim 7 wherein the axes of the inner and outer walls of said casing cylinder coincide.

9. Controller according to claim 8 wherein said casing cylinder is provided with a base support therefor.

10. Controller according to claim 7 wherein the axes of the inner and outer walls of said casing cylinder are eccentric with respect to one another, the axes of said outer wall of the casing cylinder and said rod coinciding and the axes of said inner wall of the casing cylinder and said piston coinciding.

11. Controller according to claim 7 wherein a bushing is provided between the outside wall of said piston and the inner wall of said casing cylinder.

12. Controller according to claim 7 wherein the surface of the inner wall of said casing cylinder is of substantially constant transverse dimension throughout and is interrupted only by said annular casing grooves and said passages, and wherein the clearance between said rod and the surrounding piston represented by the difference in radial length between the radius of said rod and the radius of the inside of said piston is substantially greater than the clearance between the piston and the surrounding casing cylinder represented by the difference in radial length between the radius of the inner wall of said casing cylinder and the radius of the outside wall of said piston.

13. Controller valve for control of fluid flow through at least one flow path which comprises a control casing having an axially extending casing bore and end walls axially closing said bore at the ends of said casing, a tubular control piston of smaller axial length than said casing bore and having an axially extending piston bore, said piston being disposed axially slidably within said casing bore, a drive shaft with a smaller peripheral dimension than that of said piston bore passing through said casing bore and said piston bore and having shaft end portions passing axially slidably through the corresponding end walls of said casing to the exterior of said casing, said piston having at least one shaft engaging portion and said shaft having an axis spaced from the axis of said piston bore and at least one piston engaging portion in abutment with said shaft engaging portion of said piston for operatively engaging said shaft engaging portion of said piston to displace said piston axially within said casing bore upon the corresponding slidable displacement of said shaft ends passing through said end walls, said shaft and piston being transversely displaceably positioned with respect to one another to permit slight relative transverse movements with respect to one another yet with said shaft engaging portion and said piston engaging portion remaining in abutment with one another, and at least two passages extending through said casing to said bore and at least one annular piston groove defined in the outside periphery of said piston for connecting at least in part through said casing bore said two passages in one axial position of said piston within said casing bore.

References Cited by the Examiner
UNITED STATES PATENTS

| 149,019 | 3/74 | Witty | 137—625.68 |
| 1,045,441 | 11/12 | Romick | 137—625.68 |
| 1,374,405 | 4/21 | Steiner | 137—625.68 XR |
| 2,404,349 | 7/46 | Brant et al. | 137—625.6 |

M. CARY NELSON, *Primary Examiner.*

MARTIN P. SCHWADRON, *Examiner.*